United States Patent
McCann et al.

(10) Patent No.: US 7,315,513 B2
(45) Date of Patent: Jan. 1, 2008

(54) METHOD FOR CONTROLLING DATA FLOW RATE IN AN INTERNET CONNECTION

(75) Inventors: Stephen McCann, Southampton (GB); Robert Hancock, Southampton (GB); Mark Alan West, Southampton (GB)

(73) Assignee: Roke Manor Research Limited, Romsey (GB)

( * ) Notice: Subject to any disclaimer, the term of this patent is extended or adjusted under 35 U.S.C. 154(b) by 984 days.

(21) Appl. No.: 10/149,975

(22) PCT Filed: Dec. 14, 2000

(86) PCT No.: PCT/GB00/04785

§ 371 (c)(1),
(2), (4) Date: Oct. 29, 2002

(87) PCT Pub. No.: WO01/45332

PCT Pub. Date: Jun. 21, 2001

(65) Prior Publication Data

US 2003/0103466 A1 Jun. 5, 2003

(30) Foreign Application Priority Data

Dec. 18, 1999 (GB) ................................. 9929877.0
Oct. 6, 2000 (GB) ................................. 0024467.3

(51) Int. Cl.
*H04L 12/26* (2006.01)
(52) U.S. Cl. ..................................... 370/229
(58) Field of Classification Search ................ 370/231, 370/229, 230, 230.1, 235, 249
See application file for complete search history.

(56) References Cited

U.S. PATENT DOCUMENTS 5,694,390 A * 12/1997 Yamato et al. ............... 370/230
5,748,901 A * 5/1998 Afek et al. ................. 709/238
5,970,048 A * 10/1999 Pajuvirta et al. ............ 370/230

(Continued)

FOREIGN PATENT DOCUMENTS

WO    WO 97/22196    6/1997

(Continued)

OTHER PUBLICATIONS

Deepak Bansal, Anurag Chandra, Rajev Shorey, "An Extension of the TCP Flow Control Algorithm for Wireless Networks," Feb. 17-19, 1999, pp. 207-210.*

(Continued)

*Primary Examiner*—Derrick W. Ferris
(74) *Attorney, Agent, or Firm*—Crowell & Moring LLP

(57) ABSTRACT

Described herein is a method of controlling data flow between a local network (120) and a remote network (30) via a geostationary satellite link (40, 46, 48). The local network (120) comprises a sending host (22) and a connection splitting node (124) which includes a throttling unit (150). The remote network (30) comprises a receiving host (32) which is connected to a second connection splitting node (142) having a buffer (152) via the internet (34). The data flow rate from the local network (120) is throttled to provide a data flow rate which substantially matches that which can be handled by the remote network (30) so that the buffer (152) at the second connection splitting node (142) is not overfilled.

6 Claims, 3 Drawing Sheets

U.S. PATENT DOCUMENTS

| | | | |
|---|---|---|---|
| 6,097,697 A * | 8/2000 | Yao et al. | 370/230 |
| 6,118,834 A * | 9/2000 | Rasanen | 375/372 |
| 6,233,224 B1 * | 5/2001 | Yamashita et al. | 370/231 |
| 6,438,101 B1 * | 8/2002 | Kalampoukas et al. | 370/229 |
| 6,654,344 B1 * | 11/2003 | Toporek et al. | 370/230 |

FOREIGN PATENT DOCUMENTS

| | | |
|---|---|---|
| WO | WO 99/22477 | 5/1999 |
| WO | WO 01/45332 | 12/2000 |

OTHER PUBLICATIONS

Brake, A.V.; Badrinath, B.R., "Implementation and Performance Evaluation of Indirect TCP," Mar. 1997, pp. 260-278.*
PCT International Search Report.
British Search Report.

* cited by examiner

METHOD FOR CONTROLLING DATA FLOW RATE IN AN INTERNET CONNECTION

BACKGROUND OF THE INVENTION

The present invention relates to improvements in or relating to internet access, and is more particularly, although not exclusively, concerned with controlled IP flows, where controlled implies a feedback connection.

Where TCP/IP (transmission control protocol over internet protocol) traffic flows between the internet as a whole and an essentially private, stub network across long-latency links, access to the internet is sub-optimal. Specifically, if a mobile network built around point-to-point, high latency wireless links (for example, a geostationary satellite link) is connected to the internet, the latencies involved severely restrict the performance of TCP/IP connections. However, TCP/IP is required to use flow control mechanisms for congestion avoidance and congestion recovery, but although this produces poor performance when applied to long-latency connections, it is essential to prevent the internet from collapsing.

SUMMARY OF THE INVENTION

It is therefore an object of the present invention to provide a system which improves the performance of controlled IP flows.

In accordance with one aspect of the present invention, there is provided a method of controlling data flow rate from a first network to a second network across an enhancer link, the method comprising:

determining the data flow rate in the second network;

feeding the determined data flow rate back to the first network; and adjusting the data flow rate over the enhancer link in accordance with the determined data flow rate.

Preferably, the enhancer link comprises at least one connection splitting node. In a preferred embodiment of the present invention, the. enhancer link comprises first and second connection splitting nodes, each node being associated with a respective one of the first and second networks.

Advantageously, the second connection splitting node includes a buffer for storing data during transfer to the second network.

The data flow from the first network to the second network may comprise a controlled IP flow. The step of adjusting the data flow rate at the enhancer link in accordance with the determined data flow rate comprises throttling the data flow rate from the first network so that it substantially matches the data flow rate of the second network.

This invention introduces various equations which may be used to determine the data flow rate over a controlled IP flow. These equations determine an output flow rate for the enhancer link in accordance with the round trip time of the second network and the amount of data in transit at any one time.

Other objects, advantages and novel features of the present invention will become apparent from the following detailed description of the invention when considered in conjunction with the accompanying drawings.

DETAILED DESCRIPTION OF THE DRAWINGS

A connection splitting technique has been investigated to improve the performance of TCP/IP connections over long-latency links—specifically geostationary satellites with an end-to-end latency of typically 280 ms have been considered. This has shown that buffer management is an important area to address. The reason for this is that the long round trip time (RTT) means there is a substantial delay before the sender can receive any information about the status of the other end of a flow.

The present invention will be described with reference to controlled IP flows, e.g. TCP, RTCP and RTP flows.

Figure 1:
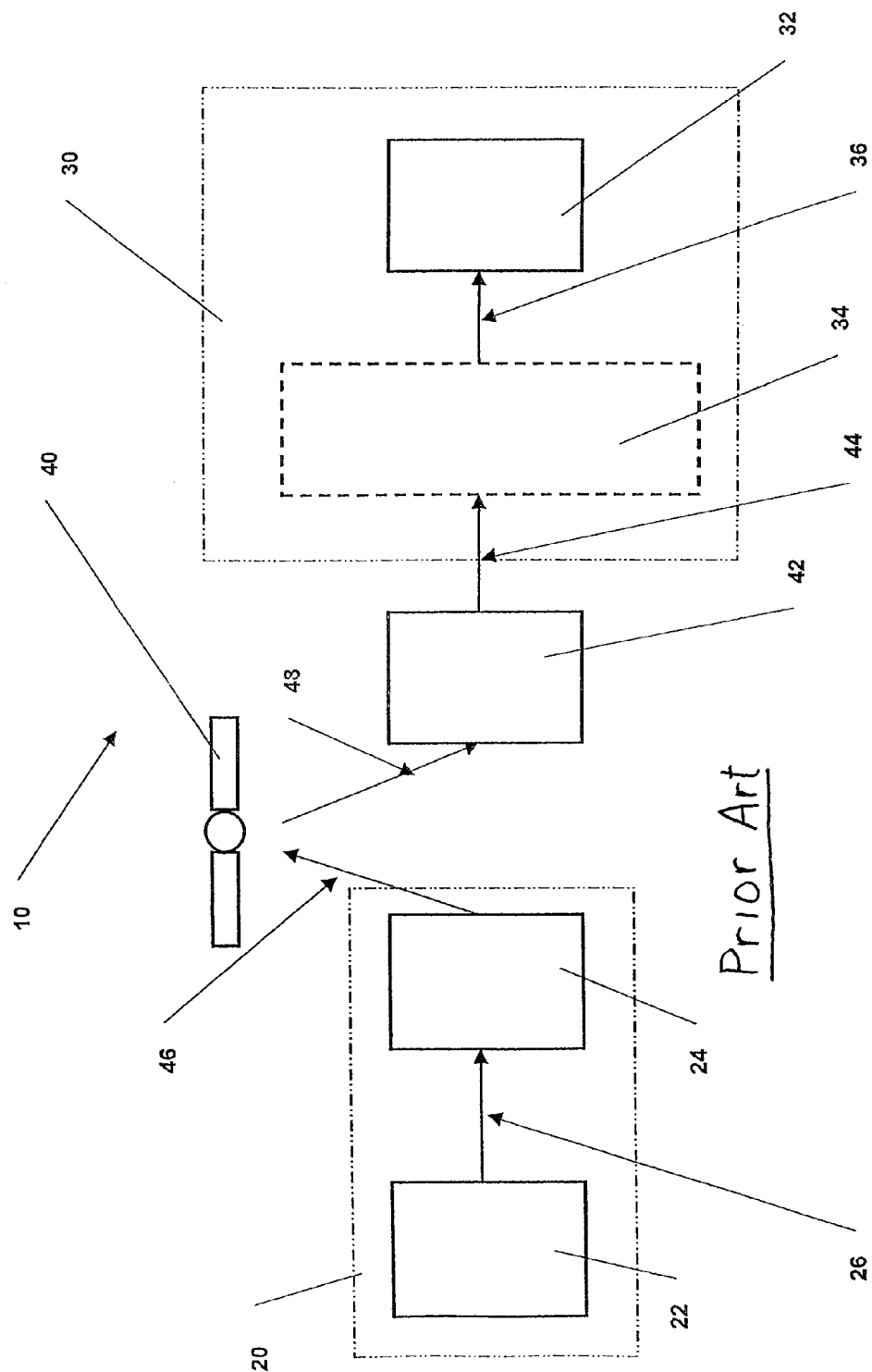
FIG. 1 illustrates a conventional geostationary satellite internet connection.

FIG. 1 shows a satellite internet flow 10 in which a local network 20 is connected to a remote network 30 via a geostationary satellite 40. The local network 20 includes a sending host 22 connected to a node 24 via link 26. The remote network 30 includes a receiving host 32 connected to the internet 34 via a link 36 and is connected to a node 42 via a link 44. As shown, the local network 20 is connected to the satellite 40 via node 24 and link 46. Similarly, the remote network 30 is connected to the satellite 40 via node 42 and links 44, 48. Operation of the flow 10 will now be described with respect to the local network 20 sending or transmitting to the remote network 30.

In FIG. 1, the sending host 22 is capable of transferring data over a local area network (LAN) (not shown) at speeds of up to 100 Mbit/s to the node 24 which performs connection splitting. As shown, node 24 and node 42 are connected by a satellite link 40, 46, 48 which typically handles data at a speed of 8 Mbit/s and has a typical RTT of 580 ms. When node 24 receives data from the sending host 22, it will automatically restrict the average send rate to that of the satellite link, that is, 8 Mbit/s.

It will readily be appreciated that node 24 effects connection splitting, that is, node 24 allows incoming data to be transmitted at a different rate.

However, the receiving host 32 in the remote network 30 receives data from the internet 34 via a modem (not shown), and can only accept data at a speed or rate of 56 kbit/s. If the sending host 22 tried to send gigabytes of data to the receiving host 32, it would rapidly be able to flood the flow buffer (not shown) on node 42, stalling the link. Again, node 42 effects connection splitting. It will be appreciated that the fixed link rates given above are by way of example only and that the link rate can be chosen to be any suitable value. Moreover, it is also possible to use a link rate which changes over the lifetime of the connection, for example, due to changes in the network capacity because of other intermittent traffic.

To avoid this, the node 24 in the local network 20 needs to control the sending rate of any given flow, based on the rate at which the receiving host 42 is accepting the data. This introduces two problems:—first, how to make an accurate enough assessment of the host data transfer capacity in the remote network 30 and, secondly, how to apply this effectively, given the long round-trip time. A flow which overcomes these problems in accordance with the present invention is shown in FIG. 2.

Figure 2:
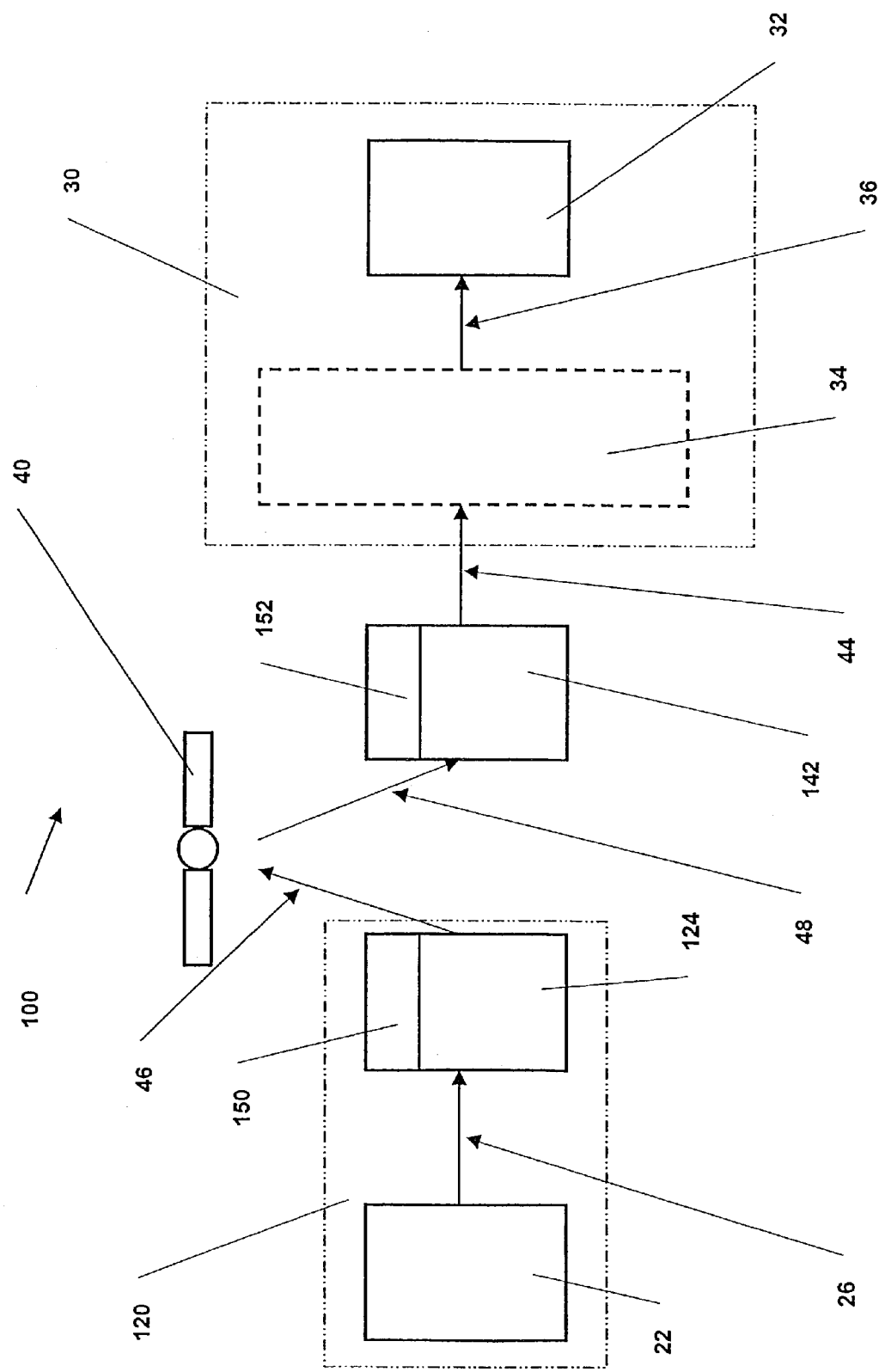
FIG. 2 illustrates a geostationary satellite internet connection in accordance with the present invention.

FIG. 2 is similar to FIG. 1 and identical components which have previously been described are referenced alike.

Components which are similar have been given the same reference numerals but with a '1' in front (for example, 120 is similar to 20).

A satellite flow 100 is shown in FIG. 2 in which a local network 120 is connected to a remote network 30 via a satellite 40. Local network 120 comprises a sending host 22 connected to a node 124 via a link 26. Node 124 includes a throttling unit 150 which enables incoming data from the sending host 22 to be slowed down to accommodate changes in rates in the flow 100. The remote network 30 comprises a receiving host 32 connected to the internet 34 via link 36, the internet 34 being connected to a node 142 via link 44. Node 142 contains a buffer 152 for storing data arriving from the sending host 22 via satellite flow 40, 46, 48, as described above with reference to FIG. 1, prior to sending it into the internet 34. As before, nodes 124 and 142 are connection splitting nodes.

FIG. 2 considers a single flow from sending host 22 to receiving host 32 across the pair of connection splitting nodes 124 and 142. Here, the current data output rate from node 124 into the satellite link 40, 46, 48 can be expressed as $R_o$, the current data output rate from node 142 into the internet 34 can be expressed as $R_i$, and T as a 'throttling' value associated with the throttling unit 150 at node 124.

In accordance with the present invention, a throttling algorithm is utilised which allows the value of the parameter 'T' to be determined within node 124. 'T' is a throttling parameter, which is used to throttle (or slow) the traffic passing through it and hence it throttles data traffic which it receives from the sending host 22. The resulting traffic flow out of node 124 into the satellite link 40, 46, 48 is then matched to that of the remote network at node 142.

The throttling algorithm uses flow rate statistics from node 142. Every set of data statistics received in a reverse traffic 'feedback' frame can be regarded as a delayed snapshot of the flow rate in node 142. For a geostationary satellite link with a typical latency of 280 ms, it is useful to configure the system, so that these 'snapshots' typically arrive every 140 ms, that is, at half the link latency.

It is useful to introduce the concept of a "data sample" at this point. This is the amount of data flowing through the node 142 for a single flow over the course of the sampling period, for example, 140 ms.

Hence, for a 56 kbit/s link, the data sample equates to:

57344×0.140=8028 bits, that is, approximately 1 kbyte.

The number of data samples stored in the buffer 152 at node 142 gives an indication of how long that flow will take to drain the buffer 152 assuming no more data is input. This number is referred to as the session buffer volume (SBV).

As described above, the nodes 124 and 142 are connection splitting nodes and need to cooperate with one another if the flow 100 is to have at an optimum performance.

As the SBV becomes large, it becomes less important for node 124 to continue to send data at the network output flow rate. In addition, it indicates that the buffer 152 is being overused for that session. The throttling unit 150 in node 124 must therefore throttle the flow back to allow the buffer 152 at node 142 to drain.

The SBV measurement is not enough to ensure that the buffer 152 at the node 142 is not overrun. The spare capacity of the buffer 152 in node 142 for all TCP sessions must also be accounted for and this is given by the receiver buffer ratio (RBR).

The data that node 124 requires from node 142 can be summarised as:

The SBV for each flow

The ratio of the overall buffer size to its current capacity, that is, the RBR

The throttling algorithm within the throttling unit 150 of node 124 attempts to match the output rate $R_o$ to that of the output rate $R_i$ of node 142 into the internet 34. This limits the amount of data flowing into node 142 so that its buffer 152 do not overfill.

Realising that the measured value of $R_i$ at node 142 is always out of date by 280 ms, that is, by two 'snapshot' periods, the throttling value T needs to be determined in accordance with:

$$R_o = TR_i \quad (1)$$

Considering the earlier definition of SBV, the following conditions apply:

when

SBV=0 T=1.0

SBV=n T→0.0 as n→∞

Hence, from equation (1):

$$T=1/(1+SBV) \quad (2)$$

or generally for a specific flow 's'

$$T_s=1/(1+SBV_s) \quad (3)$$

Equation (3) is a suitable equation for the data flow aspect of the throttling value T held in throttling unit 150 of node 124.

Additionally, to avoid overflow of buffer 152 of node 142, the overall spare capacity of buffer 152 needs to be considered as determined by RBR.

The following conditions apply:

when

RBR=0 $T_b$=0.0

RBR=n $T_b$→1.0 as n→∞

Hence:

$$T_b=1-1/(1+RBR) \quad (4)$$

Equation (4) is a suitable equation for the buffering aspect of the throttling value T.

In this case, equation (4) applies for the whole system regardless of the number of active sessions.

In addition to the above, the algorithm also requires a forcing factor P. This is required to push a small amount of extra data than that indicated by the flow rates of the node 142 across the satellite link 40, 46, 48. If this factor is not included, the send rate from node 124 will converge to the output rate from node 142, and the utilisation of the buffer 152 in node 142 will be zero. If the connection from node 142 to receiving host 32 increases in capacity at this point, node 142 will have no spare data to output and will not be able to detect the extra capacity.

A suitable value for the forcing factor is around 105% (1.05). Higher values have been shown to introduce oscillation in the usage of the buffer 152 on node 142 even with a constant flow rate between node 142 and receiving host 32.

Hence, the complete formulae for the throttling factor for any flow 's' is given by:

$$T=PT_bT_s \quad (5)$$

$$T=P(1-1/(1+RBR))(1/(1+SBV_s)) \quad (6)$$

The value thus obtained, T for a session s, is a value between 0 and 1, representing the fraction of the measured flow rate from node 142 to receiving host 32 that should be permitted across the satellite link 40, 46, 48. Any suitable rate control mechanism, for example, a token leaky bucket scheme, can be used to apply the rate control.

The above paragraph explains how node 124 calculates a link rate for a connection from information fed back from node 142—but this still requires that node 142 can supply this information correctly. The buffer data is simple—given a pool of buffers the RBR is simply the fraction of free buffers.

However, to correctly determine the value of each SBV, node 142 needs to supply a rate for data transfer between itself and the receiving host 32. This has to be a comparatively accurate instantaneous measurement. It cannot be of the form "20 kbyte transferred with connection duration of 10 s=2 kbyte/s" as this does not indicate the achievable output rate.

Figure 3:
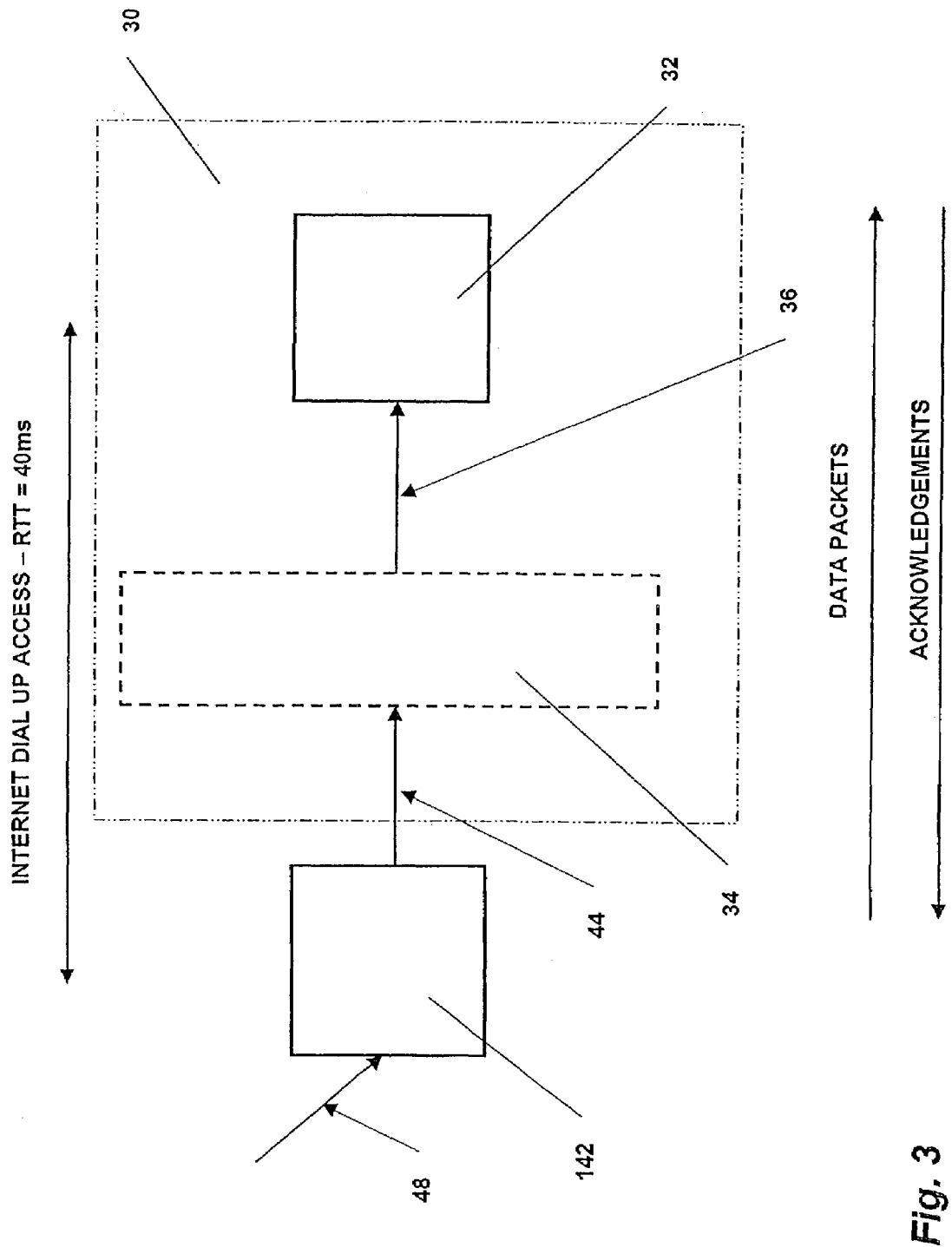
FIG. 3 illustrates a remote section of the network shown in FIG. 2.

FIG. 3 is a more detailed view of the remote network 30 shown in FIG. 2. As identical reference numerals have been used for the same components, no further description is given.

In FIG. 3, there is a TCP stack (as an example protocol using a controlled IP flow) within node 142 which is responsible for regenerating the original connection to the receiving host 32. It is within this stack that the rate determination is made. This hinges on two key measurements namely, the round-trip time between node 142 and receiving host 32, and the amount of data in transit.

The following procedure is used to determine the RTT of the remote network 30:

TCP outputs a segment and if the cycle timer is not active, a timer is started. This starts the measurement process.

The following cycle then repeats:

When an acknowledgement is received for the segment being timed, the amount of data in transit is calculated (as the unacknowledged data that has been since the just acknowledged segment). The throughput is calculated based on the cycle time and the quantity of data in transit. At the end of the cycle the timer is restarted. This means that idle time is counted as well as data transfer time and thus avoids calculating the peak rate. However, in order to estimate the achievable throughput, a cycle is not counted unless at least one full size segment of data is transferred. Additionally, the cycle time is smoothed over the last two measured times, so long idle periods have less effect. Should a retransmission occur, the timer is cancelled and will be restarted at the end of the cycle by the first rule for starting the timer.

It will be appreciated that any other suitable process can be used to determine the RTT of the remote network.

The amount of data in transit, at any time, is known by the sliding window of the flow in the remote network 30, that is, between node 142 and sending host 32. Together with the RTT value determined above, the external data rate can be accurately measured.

The following method has been used to measure the output rate at the remote end of the link. The calculation is performed in parallel for each connection, and the following definitions apply:

TCP·SND_NXT is the sequence number of the next byte to be output by this TCP connection.

TCP·SND_UNA is the earliest unacknowledged byte for the TCP connection.

The difference between these two values, therefore, gives the quantity of data in transit at the point of measurement. This calculation should be performed before SND_UNA is updated with the value of the received acknowledgement.

Alpha and beta set, respectively, the lower and upper thresholds for reporting change in output rate. Without this, every cycle will cause an update which, if the value is comparatively stable, is unnecessary. Values of 0.95 for alpha and 1.1 for beta, for example, can be used to reduce the number of updates. Setting both to a value of 1 will cause the value to be updated for every change.

```
IF
    there is an outstanding segment to be timed AND
    the received ack includes that segment THEN
        elapsed_time = time_now – cycle_start_time
        data_in_transit = TCP.SND_NXT – TCP.SND_UNA//see below
        IF data_in_transit > max_segment_size THEN
            Rate_rtt = (rate_rtt/2) + (elapsed_time/2)//smooth the
                                                       measured
                                                       cycle time
            Cycle_throughput = data_in_transit/rate_rtt
            smoothed_throughput = (smoothed_throughput/2) + (cycle_throughput/2)
            IF  (smoothed_throughput < last_update * alpha) OR
                (smoothed_throughput > last_update * beta) THEN
                    update rate with smoothed throughput
                    last_update + smoothed_throughput
            END IF
        END IF
        cycle_start_time = time_now
        clear outstanding segment to be timed
END IF
```

The foregoing diclosure has been set forth merely to illustrate the invention and is not intended to be limiting. Since modifications of the disclosed embodiments imcorporating the spirit and substance of the invention may occur to persons skilled in the art, the invention should be construed to include everything within the scope of the appended claims and equivalents thereof.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of controlling a data flow rate $R_O$ for a specific flow across an enhancer link from a first network to a second network, wherein the enhancer link comprises first and second connection splitting nodes, each node being associated with a respective one of the first and second networks, the second connection splitting node including a buffer for storing data during transfer to the second network, the method comprising:
   determining flow rate statistics at the second node, the flow rate statistics including a flow buffer volume $SBV_s$ for the specific flow;
   feeding the flow rate statistics back to the first network, determining for the specific flow a data flow rate $R_i$ for data flowing from the second connection splitting node into the second network; and
   applying at the first connection splitting node a throttling value T to adjust the data flow rate $R_O$ such that $R_O = TR_1$; and wherein,
   the throttling value T is determined in dependence upon the flow rate statistics; and
   the throttling value T is further determined in dependence upon a forcing factor P whereby a small amount of extra data in the specific flow is pushed across the enhancer link than that indicated by the flow rate of the second splitting node.

2. A method according to claim 1, wherein the flow rate statistics further comprise a receiver buffer ratio RBR of the buffer.

3. A method according to claim 1, wherein the throttling value is represented by:

$T = P(1-1/(1+RBR))(1/(1+SBV_s))$.

4. A method according to claim 1, wherein the data flow from the first network to the second network comprises a controlled IP flow.

5. A method according to claim 4, wherein the step of adjusting the data flow rate at the enhancer link in accordance with the determined data flow rate comprises throttling the data flow rate from the first network so that it substantially equals the data flow rate of the second network.

6. A method of controlling a data flow rate $R_O$ for a specific flow across an enhancer link from a first network to a second network, wherein the enhancer link comprises first and second connection splitting nodes, each node being associated with a respective one of the first and second networks, the second connection splitting node including a buffer for storing data during transfer to the second network, the method comprising:
   determining flow rate statistics at the second node, the flow rate statistics including a flow buffer volume $SBV_s$ for the specific flow;
   feeding the flow rate statistics back to the first network, determining for the specific flow a data flow rate $R_i$ for data flowing from the second connection splitting node into the second network; and
   applying at the first connection splitting node a throttling value T to adjust the data flow rate $R_O$ such that $R_O = TR_i$; and wherein,
   the throttling value T is determined in dependence upon the flow rate statistics; and
   the data flow rate $R_i$ is determined in accordance with the round trip time of the second network and the amount of data in transit at any one time.

* * * * *